O. BERGSTROM.
CORNER CLAMPING APPLIANCE.
APPLICATION FILED MAR. 18, 1912.
1,053,556. Patented Feb. 18, 1913.
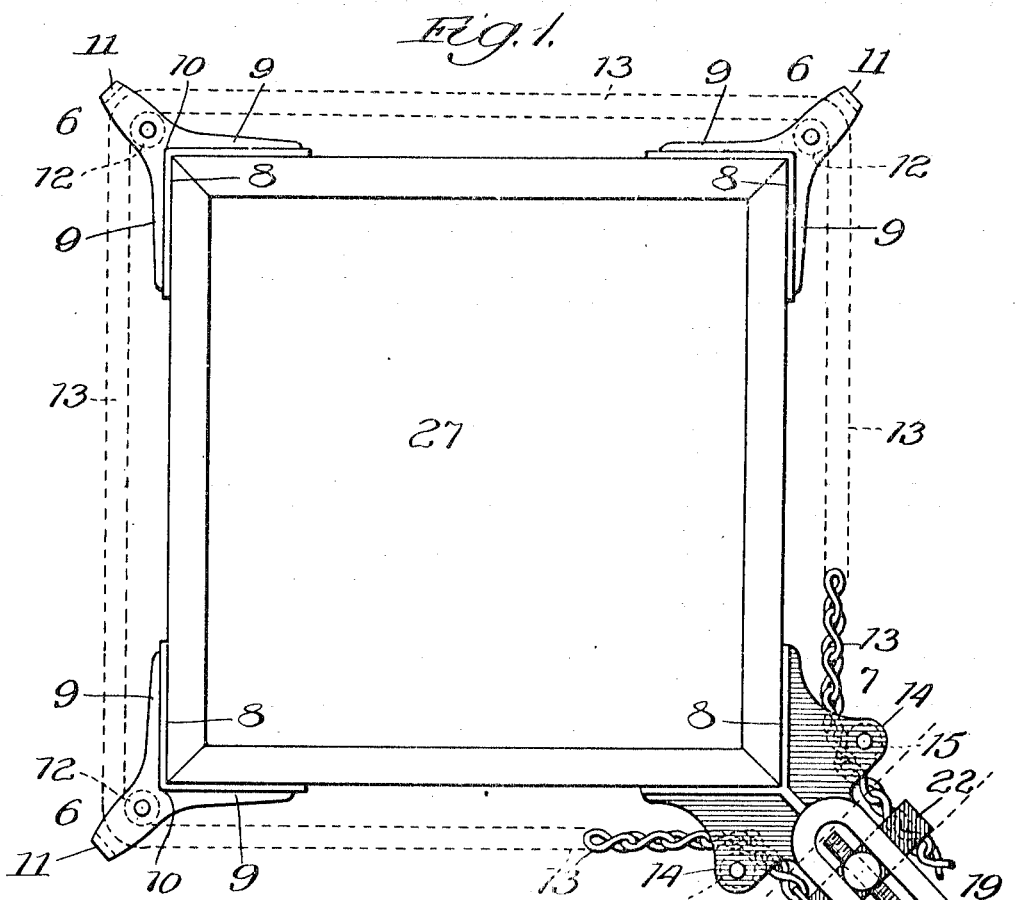
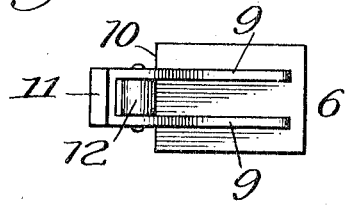
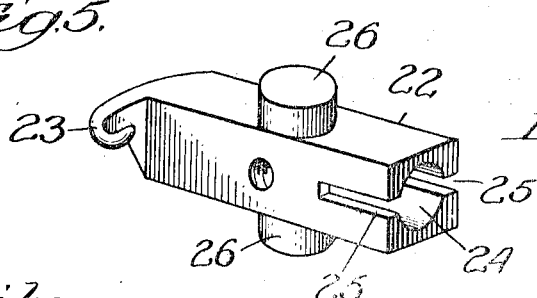
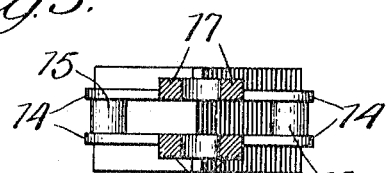
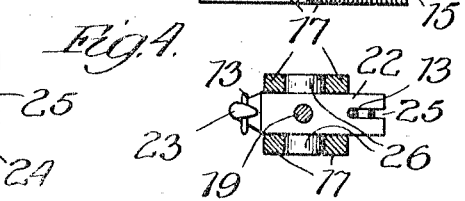
Witnesses:
Inventor:
Oscar Bergstrom,
By Dyrenforth, Lee, Chritton & Wiles,
Attys.

UNITED STATES PATENT OFFICE.

OSCAR BERGSTROM, OF CHICAGO, ILLINOIS, ASSIGNOR TO HANDY MANUFACTURING COMPANY, OF CHICAGO, ILLINOIS, A CORPORATION OF ILLINOIS.

CORNER-CLAMPING APPLIANCE.

1,053,556. Specification of Letters Patent. Patented Feb. 18, 1913.

Application filed March 18, 1912. Serial No. 684,582.

*To all whom it may concern:*

Be it known that I, OSCAR BERGSTROM, a citizen of the United States, residing at Chicago, in the county of Cook and State of Illinois, have invented a new and useful Improvement in Corner-Clamping Appliances, of which the following is a specification.

My invention relates to improvements in the class of appliances used for clamping together the sides or members of a frame, newel post, column and analogous woodwork at the opposing surfaces of their angles or corners while the glue uniting them is setting, or to facilitate securing them together by other means.

My improvements relate particularly to the kind of appliance in the class referred to consisting of a head for each angle of the work, containing a socket to fit against and embrace the same, a chain or other suitable flexible medium passed about the structure at the heads, and means for releasably fastening the chain, or the like, at its ends to tighten it about the structure at the heads and hold the parts in their proper relation.

My object is to improve, in details, the construction of the corner-heads and chain-fastening means, thereby to simplify them and render them more effective in their purpose and convenient of adjustment to and separation from the work.

In the accompanying drawing, Figure 1 is a plan view showing my complete appliance in use on a rectangular frame, the sides of which have mitered meeting-edges; Fig. 2 is a view in side elevation of one of several similar corner-clamping heads; Figs. 3 and 4 are sections respectively on line 3 and line 4, Fig. 1, and Fig. 5 is an enlarged perspective view of the adjustable member of the chain-tightener.

As shown in Fig. 1, the appliance comprises three similar heads 6, and a fourth head 7, each being an integral metal body, preferably a malleable casting, formed with a face-socket 8 of V-shape with longitudinal strengthening ribs 9 on its back. On each of the similar heads 6 the strengthening ribs meet at its apex 10 in a bifurcated bearing 11, forming an extension of the ribs and projecting outwardly from the apex and closed at its outer end, and having journaled in it, near its inner end, an anti-friction roller 12 for a chain 13. The head 7 has formed on each wing of its back a bifurcated bearing 14, in which is journaled an anti-friction roller 15 for the end-portions of the chain. From this head extends the chain-tightening device 16, constructed as follows: A hollow post 17, formed preferably of two parallel bars spaced apart and extending in line with the apex between the bearings 14, has a closed outer end forming a bearing for a set-screw 19 having a handle 20 on its outer end, shown in the preferred form of a hand-wheel. In opposite sides of the post are longitudinal slots 21. A block 22 of rectangular cross-section extends transversely through the post to project at its ends beyond the open sides thereof, one end of the block being provided with a hook 23 permanently connecting with it one end of the chain 13 and the other block-end containing a central socket 24 with slots 25 in two of its opposite sides, the socket being adapted to receive flatwise a link of the chain, and the links flanking that link entering edgewise the slots 25, whereby the free end-portion of the chain may be readily slipped into the socket, as to any link caused to register therewith, and held against longitudinal withdrawal in either direction by the confinement of the intermediate link. A pin 26 extends transversely through the block between its ends at the slots 21 to project the ends of the pin through these slots, which stop the block against longitudinal withdrawal or displacement; and the screw 19 works through the block in this pin.

To use my improved appliance on a rectangular frame 27, with the chain passed from the head 7 through the bearings 6 and across the rollers in the latter, and the free end of the chain inserted into the socket 24, the heads are adjusted against the frame-corners to embrace them, and the screw 19 is turned to tighten the chain about the structure in drawing it simultaneously at both ends by pulling the block 22 outwardly lengthwise of the post 17. Obviously, by turning the screw in the opposite direction, the chain is slackened to free the appliance, which may then be readily taken off the frame.

What I claim as new and desire to secure by Letters Patent is:

1. In a clamping appliance of the character described, in combination, a plurality of V-shaped metal heads, a chain connecting said heads and longitudinally movable thereon, and tightening means for the chain comprising a hollow post open along two opposite sides with a bearing on its outer end and slots in its two other sides, a block extending transversely through the post, having one end of the chain secured to one of its ends, a socket in its opposite end provided with side-slots, for releasably connecting therewith the free-end portion of the chain and a pin extending transversely through it between its ends into said slots, and a handle-equipped set-screw working through said bearing and pin.

2. A clamping appliance of the character described, comprising, in combination, a plurality of V-shaped metal heads forming angular face-sockets and provided with roller-equipped bearings, chain-tightening means on one head comprising a hollow post extending from its back in alinement with the apex, said post being open along two opposite sides with the roller-bearings adjacent to its base and having slots in its two other sides and a bearing on its outer end, a block extending transversely through the post and having a socket in one end provided with side-slots and a pin extending transversely through it between its ends into said slots, a chain secured at one end to an end of said block and releasably engageable at its free-end portion with said socket, and a handle-equipped set-screw working through said post-bearing and pin.

OSCAR BERGSTROM.

In presence of—
L. HEISLAR,
R. SCHAEFER.